United States Patent [19]

Madden et al.

[11] Patent Number: 5,224,178

[45] Date of Patent: Jun. 29, 1993

[54] EXTENDING DYNAMIC RANGE OF STORED IMAGE DATABASE

[75] Inventors: Thomas E. Madden, E. Rochester; Edward J. Giorgianni, Rochester, both of N.Y.

[73] Assignee: Eastman Kodak Company, Rochester, N.Y.

[21] Appl. No.: 582,306

[22] Filed: Sep. 14, 1990

[51] Int. Cl.⁵ ............................................. G06K 9/38
[52] U.S. Cl. ............................. 382/50; 358/426; 358/466; 382/54; 382/56
[58] Field of Search ........... 382/50, 51, 52, 53, 382/54, 6, 41, 56; 358/262.1, 448, 461, 465, 466, 426

[56] References Cited

U.S. PATENT DOCUMENTS

| | | | |
|---|---|---|---|
| 4,371,260 | 2/1983 | Yoshimoto et al. | 355/77 |
| 4,384,336 | 5/1983 | Frankle et al. | 382/49 |
| 4,402,015 | 8/1983 | Yamada | 358/280 |
| 4,410,909 | 10/1983 | Ueda et al. | 358/75 |
| 4,472,736 | 9/1984 | Ushio et al. | 382/50 |
| 4,491,961 | 1/1985 | Sutton et al. | 382/50 |
| 4,731,662 | 3/1992 | Udagawa et al. | 358/75 |
| 4,731,862 | 3/1988 | Tsuda et al. | 382/50 |
| 4,758,885 | 7/1988 | Sasaki et al. | 358/80 |
| 4,845,761 | 7/1989 | Cate et al. | 382/50 |
| 4,887,305 | 12/1989 | Shimura | 382/6 |
| 4,903,310 | 2/1990 | Takeo et al. | 382/6 |
| 4,953,227 | 8/1990 | Katsuma et al. | 382/50 |
| 4,972,500 | 11/1990 | Ishii et al. | 382/50 |
| 5,057,913 | 10/1991 | Nagata et al. | 358/302 |

Primary Examiner—Joseph Mancuso
Attorney, Agent, or Firm—Edward Dugas

[57] ABSTRACT

The dynamic range of a digitized image database is extended to permit shifting of encoded pixel values without 'clipping', and to provide limited windows of values into which specular highlights and unusually low reflectances or areas of objects in shadow light may be encoded and stored. Digital codes into which an image scanner output has been mapped by a scene balance mechanism are converted into a set of reduced-range digital codes of the same resolution but having a smaller range of basic image content values than the dynamic range of the digitized image data base. The code conversion mechanism operates to convert a maximum value of 100% white reflectance to an encoded value that is less than the upper limit of the dynamic range of the database to allow for the placement of specular highlights that are beyond the 100% diffuse white reflectance maximum, to convert a defined minimum value of low reflectance to an encoded value that is greater than the lower limit of the dynamic range of the database to allow for the placement of unusually low reflectances or areas of objects in shadow light, and to accommodate shifts in the digitized imagery data at both the high and low ends of the range.

14 Claims, 1 Drawing Sheet

EXTENDING DYNAMIC RANGE OF STORED IMAGE DATABASE

FIELD OF THE INVENTION

The present invention relates in general to digitized image data processing systems and is particularly directed to a mechanism for extending the dynamic range of a database which stores digitally encoded color images.

BACKGROUND OF THE INVENTION

Digital imagery processing systems, such as those employed for processing digitize color photographic images, customarily digitized images by way of an opto-electronic scanner, the output of which is encoded to some prescribed digital encoding resolution (or digital code width) that encompasses a range of values over which the contents of a scene, such as that captured on a (color) photographic recording medium, may vary. As diagrammatically illustrated in FIG. 1, for a typical color photographic negative film, this range of values R is less than the density vs. exposure latitude of the film, but is sufficiently wide to encompass those film density values that can be expected to be encountered for a typical scene. Then, by means of a preliminary image operator, such as a scene balancing mechanism, the digitized image is mapped into a set of digital codes, each of which has a digital resolution corresponding to the dynamic range of a digitized image data base (e.g. frame store), the contents of which may be adjusted in the course of driving an output device, for example enabling a print engine to output a high quality color print.

As an example, as further illustrated in FIG. 1, the mapping of the quantized output of a digital image scanning device may translate the contents of a given portion of the density vs. log exposure characteristic of a color photographic negative film into a database digital resolution of eights bits per color per pixel (twenty-four bits per pixel), with a value of 255 corresponding to maximum 100% white reflectance (normally defined as a perfect (100%) non-fluorescent white reflecting diffuser). Other density values representing lesser reflectances are encoded relative to this maximum down to a code value of zero, corresponding to a low reflectance value (e.g. black).

As a consequence, if, in addition to basic content of the scene, an image contains specular highlights (e.g. a reflection from a car bumper, identified at exposure line SH in FIG. 1), their associated pixel values will be maximally encoded or 'clipped' at 255—the same as that for the above-referenced 100% white reflectance, so that a portion of their reflectance characteristics is lost. In addition, supplemental scene balance image processing, as may be necessary to accommodate the parameters of a particular output device, may operate so to as adjust one or more pixel values upwardly, causing a further increase in the number of pixel values whose encoded values are maximal. Unfortunately, once a data value has been maximized it cannot be shifted to a lower value without similarly affecting other like valued data, so that the content of an image reproduced (printed or displayed) from the digitized image is degraded.

As a further consequence, if, in addition to basic content of the scene, an image contains unusually low reflectances or areas of objects in shadow light (e.g. shadow object identified at exposure line SS in FIG. 1), their associated pixel values will be minimally encoded or 'clipped' at 0, so that a portion of their reflectance characteristics is lost. In addition, supplemental scene balance image processing, as may be necessary to accommodate the parameters of a particular output device, may operate so to as adjust one or more pixel values downwardly, causing a further increase in the number of pixel values whose encoded values are minimal. Unfortunately, once a data value has been minimized it cannot be shifted to a higher value without similarly affecting other like valued data, so that the content of an image reproduced (printed or displayed) from the digitized image is degraded.

SUMMARY OF THE INVENTION

In accordance with the present invention, the above discussed problem is solved by extending the dynamic range of the digitized image database, so as to permit a variation or shifting of the encoded pixel values without 'clipping', to provide a limited window or range of values into which specular reflectance image points, such as a reflection from a car bumper or a specular reflection of sunlight off a water surface, may be encoded and stored, and to provide a limited window, or range of values into which unusually low reflectances or areas of objects in shadow light may be encoded and stored. In particular, the present invention is directed to a method of enabling the dynamic range of the digitized image data base to be effectively extended beyond the range of values into which the digital codes output by the image scanner corresponding to the basic scene content are mapped by an image processing (scene balance) mechanism.

For this purpose, those digital codes into which the scanner output has been mapped by the image processing operator are converted into a set of 'reduced-range' digital codes of the same digital resolution but having a smaller range of basic image content values than the dynamic range of the digitized image data base. The code conversion mechanism operates to convert a maximum value of 100% white reflectance to an encoded value that is less than the upper limit of the dynamic range of the database. For the foregoing example of an eight bit encoding and storage resolution, such a value may be somewhat less than the maximum of 255 (e.g. 225), so as to leave a limited range or window of values (here 30 values) at the upper end of the encoding range, to allow for the placement of specular highlights that are beyond the 100% white reflectance maximum, and to accommodate shifts in the digitized imagery data. The code conversion mechanism also operates to convert a defined minimum value of low reflectance to an encoded value that is greater than the lower limit of the dynamic range of the database. For the foregoing example of an eight bit encoding and storage resolution, such a value may be somewhat greater than the minimum of 0 (e.g. 10), so as to leave a limited range or window of values (here 10 values) at the lower end of the encoding range, to allow for the placement of unusually low reflectances or areas of objects in shadow light, and to accommodate shifts in the digitized imagery data.

In effect, what is achieved in accordance with the present invention is a slight or delimited compression of the encoded imagery data values in order to 'fit' the basic scene content into a reduced portion of the dynamic range of the database and allow for the encoding or translation of extended data values.

DETAILED DESCRIPTION

Figure 1:
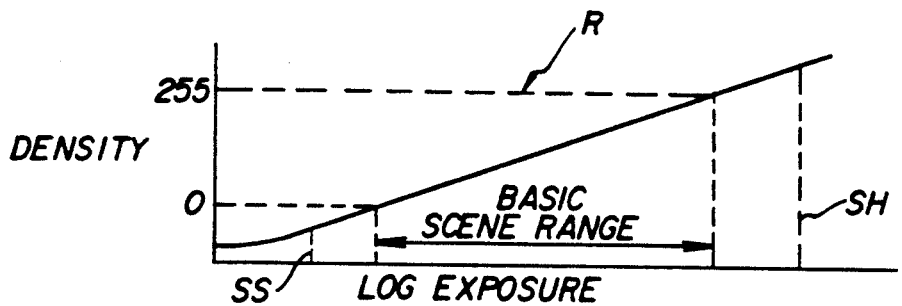
FIG. 1 diagrammatically illustrates the variation of density vs. log exposure for a color photographic negative, upon which is superimposed a range of values R less than the density vs. exposure latitude of the film.

Before describing in detail the particular image database dynamic range extension mechanism in accordance with the present invention, it should be observed that the present invention resides primarily in a novel structural combination of conventional imagery data processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the drawings do not necessarily represent the mechanical structural arrangement of the exemplary system, but are primarily intended to illustrate the major structural components of the system in a convenient functional grouping, whereby the present invention may be more readily understood.

Figure 2:
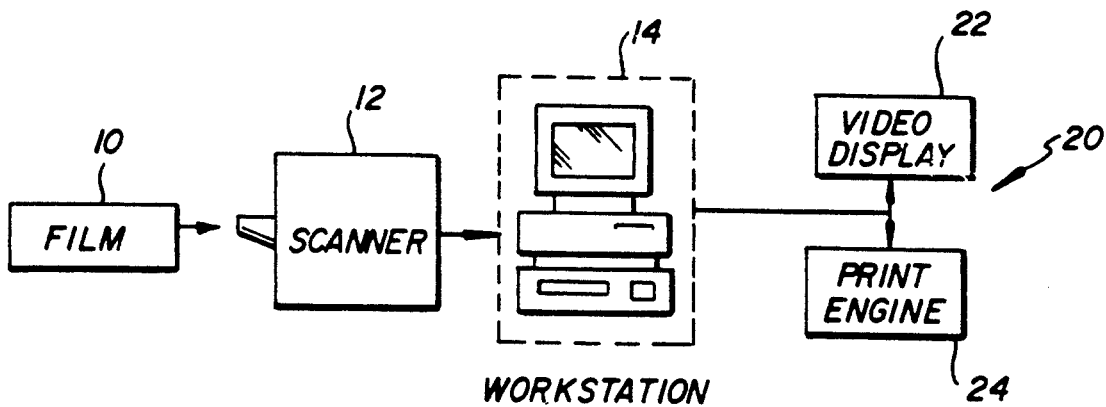
FIG. 2 diagrammatically illustrates a photographic color film processing system.

FIG. 2 diagrammatically illustrates a photographic film processing system in which the present invention may be employed. For purposes of the present description, such a system may be of the type described, for example, in copending patent application Ser. No. 582,305, filed Sep. 14, 1990, by Steven Kristy, entitled Multiresolution Digital Imagery Photofinishing System, assigned to the assignee of the present application and the disclosure of which is incorporated herein. However, it should be observed that the system described in the above-referenced copending application is merely an example of one type of system in which the invention may be used and is not to be considered limitative of the invention. In general, the invention may be incorporated in any digitized imagery processing system.

In accordance with the digitized image photo processing system of FIG. 2, photographic images, such as those captured on 35 mm color film 10, are scanned by an opto-electronic film scanner 12, such as a commercially available Eikonix, Model 1345 high spatial resolution digital scanner, which outputs digitally encoded data representative of the response of its imaging sensor pixel array onto which a photographic image contained in a respective color film frame is projected. This digitally encoded data, or 'digitized', image is coupled in the form of an imaging pixel array-representative bit map to an attendant image processing workstation 14, which contains a frame store and image processing application software through which the digitized image may be processed (e.g. enlarged, rotated, cropped, subjected to a scene balance correction mechanism, etc.) to achieve a desired base image appearance and configuration.

Once the base image has been prepared, it is written onto a transportable medium, such as a compact disc 16, for subsequent playback on a reproduction device 20, for example a relatively moderate resolution consumer television set 22, or output as a hardcopy print, as by way of a high resolution thermal color printer 24.

In accordance with the imagery data processing system described in the above referenced copending application, each captured image is stored in the form of a low resolution image and a plurality of residual images to enhance data processing speed. Regardless of the particular encoding and storage mechanism employed for digitizing the captured photographic image, the format of the data is that of a digitized image bit map 22, each low resolution pixel value of which has some prescribed code width (e.g. twenty-four bits or eight bits per color) corresponding to the dynamic range of the database (digital memory) in which the digitized image is stored.

Because the output device to which the disc-resident base image data may be delivered is not necessarily identified at the time that the base image is prepared and stored on the disc, it may be necessary to perform further processing of the stored image in the course of producing an image in a 'finalized' or 'finished' output form. This further processing may involve scene balance mechanism that tailors the image in accordance with the parameters of the output display or print engine and typically involves a shift or translation of the encoded data values of the scene. (In addition, the image may contain specular highlights that cannot be adequately represented by the maximal encoding value specified by the scene balance mechanism, and the image may contain unusually low reflectances or areas of objects in shadow light that cannot be adequately represented by the minimal encoding value specified by the scene balance mechanism).

Figure 3:
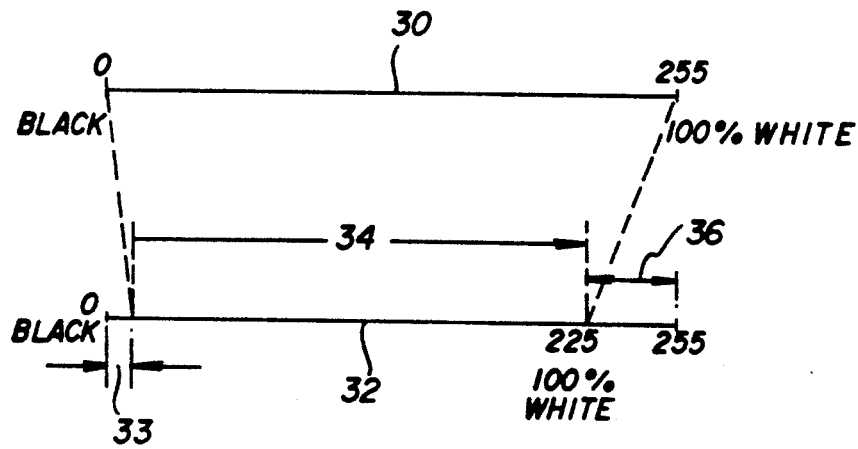
FIG. 3 diagrammatically illustrates the manner in which the present invention extends the dynamic range of a digitized image database, to permit a variation of encoded pixel values.

FIG. 3 diagrammatically illustrates the manner in which the present invention solves this limited dynamic range problem by extending the dynamic range of the digitized image database, so as to permit a variation or shifting of the encoded pixel values without 'clipping', and to provide a limited window or range of values into which specular reflectance image points, such as a reflection from a car bumper or specular reflection of sunlight off a water surface, may be encoded and stored. In the Figure, trace 30 represents the range of values obtained by the image processing operator corresponding to dynamic range of the database of interest (eight bits in the present example), with a maximum available value of 255 representing a pixel value of 100% white reflectance and a minimum available value of 0 representing a pixel value of low reflectance.

Pursuant to the invention, rather than store the encoded values such that the upper end of the dynamic range of the storage database coincides with the above-referenced 100% white reflectance, each of the image-representative codes output by the image processing operator (scene balance mechanism), is subjected to a code conversion operator resident within the image processing software of workstation 14, so that a value of 100% white reflectance has an encoded value that is somewhat less than the maximum of 255, for example a value of 225 as shown in trace 32 in FIG. 3. (The conversion mechanism may also provide for a shift at the low end of the range, as shown by offset 33. This limited 'compression' of the encoded imagery data values effectively fits the encoded data into a reduced portion 34 of the dynamic range of the database and allows for the encoding or translation of extended data values. In the present example of converting a 100% white reflectance value to a compressed encoded value of 225 leaves a limited window 36 of values (here 30 values) at the upper end of the encoding range, to allow for shifts in the digitized imagery data and the placement into this window of specular highlights that are beyond the 100% white reflectance maximum.

It should be observed that the code conversion operator of the present invention is not necessarily referenced to any particular code value (e.g. 255 for 100% white reflectance). What is essential is that, in combination with the imagery data processing operator (scene balance mechanism), it targets the location of each encoded value relative to the dynamic range of the storage device so as to ensure that there is a high reflectance window at the upper end of the range sufficient to accommodate further processing corrections and specular reflectance highlights in the image, and there is a low reflectance window at the lower end of the range sufficient to accommodate further processing corrections and unusually low reflectances or areas of objects in shadow light.

As will be appreciated from the foregoing description, the inability of conventional digitized image storage and processing schemes to accommodate translations in the data is solved in accordance with the present invention by compressing the original data values to a subset of values having the same encoding resolution of the database. This 'compression'0 of data values effectively extends the dynamic range of the digitized image database, so as to permit a variation or shifting of the encoded pixel values without 'clipping', provides a limited window of values into which specular highlights may be encoded and stored, and provides a limited window of values into which unusually low reflectances or areas of objects in shadow light may be encoded and stored.

While we have shown and described an embodiment in accordance with the present invention, it is to be understood that the same is not limited thereto but is susceptible to numerous changes and modifications as .r known to a person skilled in the art, and we therefore do not wish to be limited to the details shown and described herein but intend to cover all such changes and modifications as are obvious to one of ordinary skill in the art.

What is claimed:

1. For use with digitized image processing system in which an image digitizer outputs digital signals representative of an image, said digital signals having first digital code values of a prescribed digital code resolution which encompasses a first range of digital code values corresponding to the dynamic storage range of a digitized image data base and spanning a range of values over which the contents of said image may vary, a method of enabling the dynamic range of said digitized image data base to be effectively enlarged to accommodate extreme variations in the contents of said image comprising the steps of:
   (a) applying said first digital code values of said digital signals to a digital code conversion mechanism, which is operative to compress said first range of digital code values to a second range of digital code values less than said first range; and
   (b) operating said digital code conversion mechanism, so as to convert the first digital code values of said digital signals applied thereto in step (a) to second digital code values of said prescribed digital code resolution, but having said second range of digital code values, which is less than the dynamic range of said digitized image data base.

2. A method according to claim 1, wherein step (b) includes operating said digital code conversion mechanism to as to convert said first digital code values to second digital code values such that a first end of said second range of said second digital code values is offset form a corresponding end of the dynamic range of said digitized image data base.

3. A method according to claim 2, wherein step (b) includes operating said digital code conversion mechanism so as to convert said first digital code values to second digital code values such that a second end of said second range of said second digital code values is offset from a corresponding end of the dynamic range of said digitized image data base.

4. For use in a digitized image processing system in which an image-to-signal conversion device outputs first digital codes representative of the contents of said image, said first digital codes being subjected to a scene balance mechanism which outputs second digital codes having a prescribed digital code resolution which encompasses a first range of digital code values corresponding to the dynamic storage range of a digitized image data base and spanning a range of values over which the contents of the image output of said scene balance mechanism are permitted to vary, a method of enabling the dynamic range of the output of said digitized image data base to be extended beyond said range of values comprising the step of:
   (a) applying said second digital codes to a digital code conversion mechanism, which is operative to compress said first range of digital code values to a second range of digital code values less than said first range; and
   (b) operating said digital code conversion mechanism, so as to convert digital codes applied thereto in step (a) to third digital codes of said prescribed digital code resolution, but covering a said second range of digital code values smaller than the dynamic range of said digitized image data base.

5. A method according to claim 4, wherein step (b) includes operating said digital code conversion mechanism to convert said second digital codes to third digital codes such that one end of said second range of said third digital codes is offset from a corresponding end of the dynamic range of said digitized image data base.

6. A method according to claim 5, wherein step includes operating said digital code conversion mechanism to convert said second digital codes to third digital codes such that another end of said second range of said third digital codes is offset form a corresponding end of the dynamic range of said digitized image data base.

7. A method of digitizing an image that has been captured on a photographic medium comprising the steps of:
   (a) optically coupling said photographic medium to an opto-electronic conversion device which generates first digital codes representative of the contents of said image as captured by said photographic medium;
   (b) processing said first digital codes in accordance with a prescribed image adjustment operator which outputs second digital codes having a first digital code resolution associated with a first range of digital code values over which the contents of the image output of said prescribed image adjustment operator are permitted to vary; and (c) converting said second digital codes to third digital codes of said first digital code resolution, but covering a second range of image content values smaller than the range of values over which the contents of the image output of said prescribed image adjustment operator are permitted to vary.

8. A method according to claim 7, wherein said prescribed image adjustment operator comprises a scene balance mechanism.

9. A method according to claim 7, wherein step (c) includes converting said second digital codes to third digital codes such that the upper end of said second range of said third digital codes is below the upper end of the dynamic range of said digitized image data base.

10. A method according to claim 7, wherein step (c) includes converting said second digital codes to third digital codes such that the lower end of said second range of said third digital code values is above the lower end of the dynamic range of said digitized image data base.

11. A method according to claim 7, wherein step (a) comprises scanning a color photographic image capture medium by means of an opto-electronic scanning device which outputs said first digital codes representative of the color contents of the image captured on said color photographic image capture medium.

12. For use with digitized image processing system in which an image digitizer outputs digital signals representative of an image, said digital signals having first digital code values of a prescribed digital code resolution which encompasses a first range of digital code values corresponding to the dynamic storage range of a digitized image data base and spanning a range of values over which the contents of said image may vary, an apparatus for enabling the dynamic range of said digitized image data base to be effectively enlarged to accommodate extreme variations in the contents of said image comprising:

a digital code conversion mechanism, which is operative to compress said first range of digital code values to a second range of digital code values less than said first range; and means for applying said first digital code values to said digital code conversion mechanism, so as to convert said first digital code values of said digital signals to second digital code values of said prescribed digital code resolution, but having said second range of digital code values, which is less than the dynamic range of said digitized image data base.

13. An apparatus according to claim 12, wherein said digital code conversion mechanism is operative to convert said first digital code values to second digital code values such that a first end of said second range of said second digital code values is offset from a corresponding end of the dynamic range of said digitized image data base.

14. An apparatus for digitizing an image that has been captured on a photographic medium comprising:

means for optically coupling said photographic medium to an opto-electronic conversion device which generates first digital codes representative of the contents of said image as captured by said photographic medium;

means for processing said first digital codes in accordance with a prescribed image adjustment operator which outputs second digital codes having a first digital code resolution associated with a first range of digital code values over which the contents of the image output of said prescribed image adjustment operator are permitted to vary; and means for converting said second digital codes to third digital codes of said first digital code resolution, but covering a second range of image content values smaller than the range of values over which the contents of the image output of said prescribed image adjustment operator are permitted to vary.

* * * * *

UNITED STATES PATENT AND TRADEMARK OFFICE
CERTIFICATE OF CORRECTION

PATENT NO. : 5,224,178
DATED : June 29, 1993
INVENTOR(S) : Thomas E. Madden and Edward J. Giorgianni It is certified that error appears in the above-indentified patent and that said Letters Patent is hereby corrected as shown below:

Column 6, claim 2, line 6, "form" should read —from —.
Column 6, claim 6, line 5, "form" should read —from —.

Signed and Sealed this

Eighth Day of November, 1994

Attest:

BRUCE LEHMAN

Attesting Officer        Commissioner of Patents and Trademarks